Patented Mar. 30, 1937

2,075,203

UNITED STATES PATENT OFFICE 2,075,203

HYDRATION OF OLEFINES

Walter Philip Joshua, Cheam, Herbert Muggleton Stanley, Tadworth, and John Blair Dymock, Sutton, England No Drawing. Application December 22, 1933, Serial No. 703,674. In Great Britain January 24, 1933

8 Claims. (Cl. 260—156)

The present invention relates to the production of ethyl alcohol by direct combination of ethylene with water vapor.

It is well known that water vapor and ethylene will combine with the formation of ethyl alcohol at high temperatures and without the presence of substances having a catalytic effect on the reaction, but the amount of conversion is too small to be utilized on a practical scale.

A number of catalysts have been proposed for use in this reaction, such as, for example, thoria, or phosphoric acid on charcoal.

According to the present invention ethylene and water vapor are caused to combine at high temperatures at atmospheric or increased pressures in the presence of a catalyst compounded from phosphoric acid with calcium, and/or barium, and/or strontium, and/or magnesium or oxides or other compounds thereof, the amount of phosphoric acid present in the catalyst being in excess of that required to form the orthophosphate of the element or elements employed. It is also advantageous to incorporate boron as a secondary component in the mixture, in which case the amount of phosphoric acid must be in excess of that required to form the orthophosphate of the boron as well as of the primary element or elements.

Suitable catalysts may be prepared according to the process described in our co-pending application Ser. No. 692,222 or the catalysts as such may be used in the solid state in the form of granules, flakes and so forth or may be supported on inert carriers, such as electrode carbon and the like, or these inert materials may be impregnated with the catalyst in liquid form and be subsequently dried.

The reaction may be carried out at temperatures of 100–350° C., but we prefer to use temperatures above 150° C. Atmospheric pressure may be employed, or increased pressure up to 250 atmospheres may be used. The catalysts of the present invention may be used alone or in conjunction with other catalysts known to favor the direct combination of olefines and steam.

The following examples illustrate the manner in which the invention may be carried into effect and the results obtained:—

Example 1

A catalyst of the composition 1.0 mol. CaO and 2.0 mols $H_3PO_4$ was prepared by evaporating down the requisite quantities of lime and phosphoric acid. The product was dried at 200° C., powdered and intimately mixed with 3 per cent. of linseed oil. The resulting mass was baked at 200° C. for about 2 hours and tableted into tablets of ¼ inch size with the addition of a further 2 per cent. of linseed oil, the tablets being finally baked at 200° C. for 2 hours.

Over 100 cc. of this catalyst at 280° C. was passed a mixture of 2.2 mols of ethylene and 1 mol. of steam under a total pressure of 20 atmospheres at a gas rate of about 400 litres per hour of ethylene calculated at normal temperature and pressure. 5.60 grams of alcohol per hour were obtained in the form of a 3.45 per cent. aqueous condensate.

Example 2

Over 100 cc. of the same catalyst as in Example 1 but at 290° C. was passed a mixture of 1.37 mols of ethylene and 1 mol. of steam under a total pressure of 40 atmospheres and at a gas rate of about 1250 litres per hour of ethylene calculated at normal temperature and pressure. The hourly output of alcohol was 15.9 grams in the form of a 4.53 per cent. aqueous condensate.

Example 3

A catalyst of the composition 1.0 mol. BaO and 2.0 mols $H_3PO_4$ was prepared by evaporating down the requisite quantities of barium hydroxide and phosphoric acid. Towards the end of the evaporation 5 per cent. of linseed oil was incorporated and the mass was baked at 250° C. and tableted into tablets of ¼ inch size with a further 3 per cent. of linseed oil, the tablets being baked finally at 250° C.

Over 100 cc. of this catalyst at 280° C. was passed a mixture of 2.3 mols of ethylene and 1 mol. of steam at a total pressure of 20 atmospheres and at a gas rate of about 420 litres of ethylene per hour calculated at normal temperature and pressure. The hourly alcohol output was 6.36 grams.

Example 4

Over 100 cc. of the same catalyst as in Example 3 but at 290° C. and under a total pressure of 40 atmospheres was passed a mixture of 3.0 mols of ethylene and 1 mol. of steam at a gas rate of 1250 litres per hour of ethylene, calculated at normal temperature and pressure. The hourly alcohol output of 12.48 grams in the form of a 3.50 per cent. aqueous condensate.

Example 5

A catalyst of the composition 1.0 mol. SrO and 2.0 mols $H_3PO_4$ was prepared by evaporating down the requiste quantities of strontium hydroxide and phosphoric acid. Towards the end of the evaporation 5 per cent. of linseed oil was incorporated and the mass was baked at 250° C., tabletted into pellets of ¼ inch size with a further 3 per cent. of linseed oil and finally baked at 250° C.

Over 100 cc. of this catalyst at 280° C. was passed a mixture of 2.3 mols of ethylene and 1 mol. of steam under a total pressure of 20 atmospheres and at a gas rate of about 400 litres per hour of ethylene calculated at normal temperature and pressure. The hourly alcohol output was 8.76 grams in the form of a 5.73 per cent. condensate.

Example 6

Over 100 cc. of the same catalyst as in Example 5 but at 290° C. and under 40 atmospheres pressure a mixture of 3.0 mols of ethylene and 1 mol. of steam was passed at a gas velocity of 1250 litres per hour of ethylene calculated at normal temperature and pressure. The hourly output of alcohol was 18.60 grams in the form of a 5.07 per cent. aqueous condensate.

Example 7

A catalyst of the composition 1.0 mol. CaO; 0.5 mol. $B_2O_3$; and 3.6 mols $H_3PO_4$ was prepared by mixing and evaporating down the requisite quantities of lime, boron trioxide and phosphoric acid, and 5 per cent. of linseed oil was added with stirring during the final stages of the evaporation. The product was baked at 250° C. for 2 hours, powdered and tabletted into tablets of ¼ inch size with the addition of a further 3 per cent. of linseed oil. The tablets were finally baked at 250° C. for 2 hours.

Over 100 cc. of this catalyst at 280° C. was passed a mixture of 2.3 mols of ethylene and 1 mol. of steam under a total pressure of 20 atmospheres and at a gas rate of 400 litres per hour of ethylene calculated at normal temperature and pressure. The hourly output of alcohol was 10.7 grams in the form of a 6.41 per cent. aqueous condensate, the conversion of ethylene per passage being 1.15 per cent.

Example 8

Over 100 cc. of the same catalyst as in Example 7 and at 290° C. was passed under a total pressure of 40 atmospheres a mixture of 3.0 mols of ethylene and 1 mol. of steam at a gas rate of about 1200 litres per hour of ethylene calculated at normal temperature and pressure. The alcohol output was 46.7 grams and the concentration of alcohol in the aqueous condensate was 11.30 per cent. The conversion of ethylene per passage was 1.70 per cent.

Example 9

A catalyst of the composition 1.0 mol. BaO; 0.5 mol. $B_2O_3$; and 3.6 mols $H_3PO_4$ was prepared by evaporating down the requisite amounts of $Ba(OH)_2$, $H_3PO_4$ and $B_2O_3$ and intimately admixing 5 per cent. of linseed oil in the final stages of evaporation. The mass was powdered, baked at 250° C. and tabletted into tablets of ¼ inch size with 3 per cent. of linseed oil, the tablets being finally baked at 250° C. for 2 hours.

Over 100 cc. of this catalyst at 280° C. was passed under 20 atmospheres total pressure a mixture of 2.3 mols of ethylene and 1 mol. of steam at a gas rate of about 420 litres per hour of ethylene calculated at normal temperature and pressure. The hourly output of alcohol was 7.40 grams in the form of a 2.12 per cent. aqueous condensate.

Example 10

Over 100 cc. of the same catalyst as in Example 9 but at 290° C. was passed under a total pressure of 40 atmospheres a gas mixture of 3.0 mols of ethylene and 1 mol. of steam at a gas velocity of 1250 litres per hour of ethylene calculated at normal temperature and pressure. The hourly output of alcohol was 25.0 grams in the form of a 7.10 per cent. aqueous condensate.

Example 11

A catalyst of the composition 1.0 mol. SrO; 0.5 mol. $B_2O_3$; and 3.6 mols $H_3PO_4$ was prepared by evaporating down the requisite amounts of $Sr(OH)_2$, $B_2O_3$ and $H_3PO_4$ and intimately admixing 5 per cent. of linseed oil during the last stages of evaporation; it was then tabletted into tablets of ¼ inch size with 3 per cent. linseed oil and baked at 250° C.

Over 100 cc. of the tablets of this catalyst at 290° C. was passed at a total pressure of 40 atmospheres a mixture of 3.0 mols of ethylene and 1 mol. of steam at a gas velocity of 1250 litres of ethylene per hour, calculated at normal temperature and pressure. The hourly output of alcohol was 20.7 grams in the form of a 5.20 per cent. aqueous condensate.

Example 12

A catalyst was prepared containing 1 mol. MgO; 0.5 mol. $B_2O_3$; and 3.6 mols of phosphoric acid. Over 100 cc. of this catalyst at a temperature of 280° C. and under a total pressure of 20 atmospheres, ethylene and steam were passed in the proportions of 2.3 mols of ethylene to 1 mol. of steam at a rate of 445 litres of ethylene per hour calculated at normal temperature and pressure. A yield of 4.64 grams of ethyl alcohol was obtained in the form of a 3 per cent. condensate.

What we claim is:—

1. The method of producing ethyl alcohol comprising combining ethylene with sufficient water vapor to ensure predominant ethyl alcohol formation at elevated temperature between 100° C. and 350° C. in the presence of a solid catalyst comprising essentially phosphoric acid and a substantial amount of a metal taken from a group consisting of calcium, barium, strontium and magnesium, the amount of phosphoric acid present in the catalyst being in excess of that required to form the corresponding ortho-phosphate but not in so great an excess as to make the catalyst fluid.

2. The method of producing ethyl alcohol comprising combining ethylene with sufficient water vapor to ensure predominant ethyl alcohol formation at elevated temperature between 100° C. and 350° C. in the presence of a solid catalyst comprising essentially phosphoric acid and a substantial amount of a metal taken from a group consisting of calcium, barium, strontium and magnesium, the amount of phosphoric acid present in the catalyst being in excess of that required to form the corresponding ortho-phosphate but not in so great an excess as to make the catalyst fluid.

3. The method of producing ethyl alcohol comprising combining ethylene with sufficient water vapor to ensure predominant ethyl alcohol formation at elevated temperature between 100° C. and 350° C. and at superatmospheric pressure up to about 250 atmospheres in the presence of a solid catalyst comprising essentially phosphoric acid and a substantial amount of a metal taken from a group consisting of calcium, barium, strontium and magnesium, the amount of phosphoric acid present in the catalyst being in excess of that required to form the corresponding ortho-phosphate but not in so great an excess as to make the catalyst fluid.

4. The method of producing ethyl alcohol comprising combining ethylene with water vapor at elevated temperature between 100° C. and 350° C. in the presence of a solid catalyst comprising essentially phosphoric acid and boron and any of the metals taken from the group consisting of calcium, barium, strontium and magnesium, the amount of phosphoric acid present in the catalyst being in excess of that required to form the corresponding ortho-phosphates of boron and of the group metal selected but not in so great an excess as to make the catalyst fluid.

5. The method of producing ethyl alcohol comprising combining ethylene with water vapor at elevated temperature between 100° C. and 350° C. and at super-atmospheric pressure up to about 250 atmospheres in the presence of a solid catalyst comprising essentially phosphoric acid and boron and any of the metals taken from the group consisting of calcium, barium, strontium and magnesium, the amount of phosphoric acid present in the catalyst being in excess of that required to form the corresponding ortho-phosphates of boron and of the group metal selected but not in so great an excess as to make the catalyst fluid.

6. The method of producing ethyl alcohol comprising combining ethylene with sufficient water vapor to ensure predominant ethyl alcohol formation at elevated temperature between 100° C. and 350° C. in the presence of a solid catalyst compounded from phosphoric acid and a phosphate forming substance containing a substantial amount of a metal taken from a group consisting of calcium, barium, strontium and magnesium, the amount of phosphoric acid present in the catalyst being in excess of that required to form the corresponding ortho-phosphate but not in so great an excess as to make the catalyst fluid.

7. The method of producing ethyl alcohol comprising combining ethylene with water vapor at elevated temperature between 100° C. and 350° C. and in the presence of a solid catalyst comprising essentially phosphoric acid and boron together with a substantial amount of any of the metals taken from the group consisting of calcium, barium, strontium, magnesium, the amount of phosphoric acid present in the catalyst being in excess of that required to form the corresponding orthophosphates of the boron and of the group metal selected, but not in so great an excess as to make the catalyst fluid.

8. The method of producing ethyl alcohol comprising combining ethylene with water vapor at elevated temperature between 100° C. and 350° C. and at superatmospheric pressure up to 250 atmospheres in the presence of a solid catalyst comprising essentially phosphoric acid and boron together with a substantial amount of any of the metals taken from the group consisting of calcium, barium, strontium, magnesium, the amount of phosphoric acid present in the catalyst being in excess of that required to form the corresponding orthophosphates of the boron and of the group metal selected, but not in so great an excess as to make the catalyst fluid.

WALTER PHILIP JOSHUA.
HERBERT MUGGLETON STANLEY.
JOHN BLAIR DYMOCK.